US012656985B2

(12) United States Patent
Sakuma

(10) Patent No.: US 12,656,985 B2
(45) Date of Patent: Jun. 16, 2026

(54) VEHICLE DISPLAY CONTROL DEVICE, DISPLAY METHOD, AND STORAGE MEDIUM

(71) Applicant: TOYOTA JIDOSHA KABUSHIKI KAISHA, Toyota (JP)

(72) Inventor: Yasushi Sakuma, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 17/812,007

(22) Filed: Jul. 12, 2022

(65) Prior Publication Data

US 2023/0036783 A1 Feb. 2, 2023

(30) Foreign Application Priority Data

Jul. 27, 2021 (JP) ................................. 2021-122675

(51) Int. Cl.
| | |
|---|---|
| *G06F 3/14* | (2006.01) |
| *B60K 35/10* | (2024.01) |
| *B60K 35/22* | (2024.01) |
| *B60K 35/23* | (2024.01) |
| *B60W 60/00* | (2020.01) |

(Continued)

(52) U.S. Cl.
CPC ................ *G06F 3/14* (2013.01); *B60K 35/10* (2024.01); *B60K 35/22* (2024.01); *B60K 35/23* (2024.01); *G02B 27/0101* (2013.01); *G07C 5/06* (2013.01); *B60W 60/005* (2020.02); *B60W 2554/4041* (2020.02); *B60W 2554/802* (2020.02); *G02B 2027/014* (2013.01); *G02B 2027/0141* (2013.01)

(58) Field of Classification Search
CPC . G06F 3/14; G02B 27/0101; G02B 2027/014; G02B 2027/0141; G07C 5/06; B60W 60/005; B60W 2554/4041; B60W 2554/802; B60W 2554/804; B60W 30/16; B60W 2050/146; B60W 50/14; B60K 2360/172; B60K 2360/175; B60K 2360/179; B60K 35/00; B60K 35/23; B60K 35/28; G09G 2340/0464; G09G 2380/10
See application file for complete search history.

(56) References Cited

U.S. PATENT DOCUMENTS

| | | | |
|---|---|---|---|
| 2004/0044460 A1 | 3/2004 | Kikuchi | |
| 2017/0276938 A1* | 9/2017 | Nakashima | .......... B60K 35/215 |

(Continued)

FOREIGN PATENT DOCUMENTS

| | | |
|---|---|---|
| CN | 107985310 A | 5/2018 |
| CN | 108025645 A | 5/2018 |

(Continued)

*Primary Examiner* — Navid Z. Mehdizadeh
*Assistant Examiner* — Micah Chuen-Him Cheng
(74) *Attorney, Agent, or Firm* — Dickinson Wright, PLLC

(57) ABSTRACT

A vehicle display control device displays a predetermined image at a display region showing a view ahead of a vehicle, the device including: a memory; and a processor coupled to the memory, the processor being configured to: acquire a travel state of the vehicle, and in a case in which the acquired travel state is a first mode in which an object ahead of the vehicle is detected and travel of the vehicle is controlled, display, at the display region, a first image indicating that the travel state is the first mode at a position that does not overlap with the object ahead of the vehicle.

8 Claims, 8 Drawing Sheets

(51) Int. Cl.
  G02B 27/01       (2006.01)
  G07C 5/06        (2006.01)

(56)              References Cited

U.S. PATENT DOCUMENTS

| 2018/0257489 A1 | 9/2018 | Watanabe et al. | |
|---|---|---|---|
| 2018/0286094 A1 | 10/2018 | Shishido et al. | |
| 2018/0299286 A1* | 10/2018 | Iguchi | B60K 35/215 |
| 2019/0291577 A1 | 9/2019 | Mizuno et al. | |
| 2019/0333481 A1 | 10/2019 | Hato et al. | |
| 2022/0126690 A1* | 4/2022 | Maeda | G08G 1/16 |
| 2022/0242317 A1* | 8/2022 | Nakagawa | H04N 23/61 |

FOREIGN PATENT DOCUMENTS

| CN | 110304059 A | 10/2019 |
|---|---|---|
| JP | H0717293 A | 1/1995 |
| JP | H10151964 A | 6/1998 |
| JP | 2004123081 A | 4/2004 |
| JP | 2019162987 A | 9/2019 |
| WO | 2017046937 A1 | 3/2017 |
| WO | 2017046938 A1 | 3/2017 |

* cited by examiner

FIG.2

VEHICLE DISPLAY CONTROL DEVICE, DISPLAY METHOD, AND STORAGE MEDIUM

CROSS-REFERENCE TO RELATED APPLICATION

This application is based on and claims priority under 35 USC 119 from Japanese Patent Application No. 2021-122675 filed on Jul. 27, 2021, the disclosure of which is incorporated by reference herein.

BACKGROUND

Technical Field

The present disclosure relates to a vehicle display control device, a display method, and a storage medium.

Related Art

International Publication (WO) No. 2017/046937 discloses a vehicle display device including a display region provided so as to overlap with the position of a front window of a vehicle.

In this vehicle display device, when a vehicle detects and follows a preceding vehicle, a display mark for highlighting the preceding vehicle is displayed superimposed on the preceding vehicle. This reveals to an occupant who has seen the display mark that the vehicle is engaged in following-travel relative to the preceding vehicle.

However, as in the technique described in International Publication (WO) No. 2017/046937, when a display mark indicating that a vehicle is engaged in following-travel is displayed superimposed on a preceding vehicle, there are cases in which it is difficult to distinguish between a preceding vehicle and an image, and there is a risk of the occupant experiencing frustration.

SUMMARY

The present disclosure has been made in consideration of the foregoing points, and aims to provide a vehicle display control device, a display method, and a storage medium capable of improving visibility for an occupant in cases in which an object ahead of the vehicle is detected and an occupant who has viewed the display region is informed that travel of the vehicle is being controlled.

A vehicle display control device according to a first aspect of the present disclosure is a vehicle display control device configured to display a predetermined image at a display region showing a view ahead of a vehicle, the device including an acquisition section configured to acquire a travel state of the vehicle, and a display section configured to display, at the display region, a first image indicating that the travel state is a first mode at a position that does not overlap with an object ahead of the vehicle, in a case in which the acquired travel state is the first mode, in which an object ahead of the vehicle is detected and travel of the vehicle is controlled.

According to the first aspect, the vehicle display control device displays a predetermined image at a display region showing a view ahead of the vehicle. Further, the vehicle display control device acquires the travel state of the vehicle, and displays the first image at the display region in a case in which the acquired travel state is the first mode, in which an object ahead of the vehicle is detected and travel of the vehicle controlled. This enables an occupant who has viewed the display region to be informed that a forward object has been detected and travel of the vehicle is being controlled. The first image is displayed at a position in the display region that does not overlap with the object ahead of the vehicle. Accordingly, an occupant who has viewed the display region can clearly distinguish between the object ahead of the vehicle and the first image, enabling visibility for the occupant to be improved.

A vehicle display control device according to a second aspect of the present disclosure is the configuration of the first aspect, in which, in a case in which the acquired travel state is a second mode enabling a switch to the first mode in a case in which an object ahead of the vehicle is detected, the display section switches an image displayed at the display region to a second image indicating that the travel state is the second mode.

In the vehicle display control device according to the second aspect, in a case in which the acquired travel state is a second mode enabling a switch to the first mode in a case in which an object ahead of the vehicle is detected, the image displayed at the display region is switched to the second image. Accordingly, at the time of a state in which no object is present ahead of the vehicle, by informing an occupant who has viewed the display region that it will be possible to switch to the first mode in a case in which an object is detected ahead of the vehicle, the occupant can be imparted with a sense of security.

A vehicle display control device according to a third aspect of the present disclosure is the configuration of the first aspect or the second aspect, in which the display section is configured to perform switching of the image displayed at the display region in a case in which an amount of change related to the travel state of the vehicle is equal to or greater than a predetermined threshold value.

In the vehicle display control device according to the third aspect, the image displayed at the display region is switched in a case in which an amount of change relating to the travel state of the vehicle is equal to or greater than a predetermined threshold value. Namely, image switching is not performed until the amount of change relating to the travel state exceeds a predetermined threshold value, and image switching is performed after a predetermined travel state has been maintained for a given period. This enables "hunting", in which a displayed image is frequently switched when the travel state of the vehicle is frequently switched, to be prevented, thereby enabling visibility for the occupant to be improved.

A vehicle display control device according to a fourth aspect of the present disclosure is the configuration of any one of the first aspect to the third aspect, in which the display section is configured to enable switching of the image displayed at the display region to the first image in a case in which the vehicle is traveling in a predetermined travel area.

In the vehicle display control device according to the fourth aspect, in a case in which the vehicle is traveling through a predetermined travel area, the image displayed at the display region can be switched to the first image. This enables a switch to the first image in a case in which, for example, the vehicle is traveling in a travel area in which travel in the first mode can be continued for a long time. Accordingly, when driving in a travel area in which the travel state frequently switches, visibility for an occupant can be improved by intentionally not performing switch to the first image even in a state of travel in the first mode.

A vehicle display control device according to a fifth aspect of the present disclosure is the configuration of any one of the first to fourth aspects, in which the display section is configured to not display the first image at the display region in a case in which a difference in relative velocity between the vehicle and the object is equal to or greater than a predetermined threshold value at a time at which the vehicle is traveling in the first mode.

In the vehicle display control device according to the fifth aspect, in a case in which the difference in relative velocity between the vehicle and the object is equal to or greater than a predetermined threshold value while the vehicle is traveling in the first mode, the first image is not displayed at the display region. Accordingly, in cases in which it is assumed that an object will move away from the vehicle within a short period of time and no longer be a detection target, and in cases in which an object rapidly approaches a vehicle within a short period of time and it is assumed that it will be difficult to display an image between the object and the vehicle, the first image is not displayed. This enables the first image to be displayed only in a case in which the first image can be stably displayed for a relatively long period of time, thereby reducing inconvenience caused by frequent image switching and improving visibility for the occupant.

A vehicle display control device according to a sixth aspect of the present disclosure is the configuration of any one of the first to fifth aspects, in which the first mode is a travel state that is configured to detect a moving object ahead of the vehicle and control travel of the vehicle so as to follow the moving object, and the display section is configured to display the first image between the vehicle and the moving object at the display region.

In the vehicle display control device according to the sixth aspect, in a case in which the vehicle is in a travel state in which a moving object ahead of the vehicle is detected and travel of the vehicle controlled so as to follow the moving object, the first image can be displayed at the display region. This enables visibility for an occupant to be improved when informing an occupant who has viewed the display region that the vehicle is following a preceding moving object.

A vehicle display control device according to a seventh aspect of the present disclosure is the configuration of any one of the first to fifth aspects, in which the display region includes a projection plane that is projected onto by a head-up display at a vehicle front side relative to a driver's seat, and the display section is configured to display the first image between the vehicle and the object in a view ahead of the vehicle that is viewed through the display region.

In the vehicle display control device according to the seventh aspect, a display region indicating the view ahead of the vehicle is configured as a projection plane projected onto by a head-up display device at a vehicle front side relative to the driver's seat. Further, the first image is displayed between the vehicle and the object in the view ahead of the vehicle that is viewed through the display region. Accordingly, since the first image is displayed in a manner consistent with the view ahead that is visible from the driver's seat through the projection plane, an occupant of the driver's seat is able to view the first image without significantly moving his or her line of sight.

A display method according to an eighth aspect of the present disclosure is a method of displaying a predetermined image at a display region showing a view ahead of a vehicle, the method including: acquiring a travel state of the vehicle; and, in a case in which the acquired travel state is a first mode in which an object ahead of the vehicle is detected and travel of the vehicle is controlled, displaying, at the display region, a first image indicating that the travel state is the first mode between the vehicle and the object.

In the display method according to the eighth aspect, as described above, it is possible to improve visibility for an occupant when an object ahead of the vehicle is detected and the occupant, who has viewed the display region, is informed that travel of the vehicle is being controlled.

A program according to a ninth aspect of the present disclosure is a program that causes a predetermined image to be displayed at a display region showing a view ahead of a vehicle, the program causing a computer to acquire a travel state of the vehicle; and, in a case in which the acquired travel state is a first mode in which an object ahead of the vehicle is detected and travel of the vehicle is controlled, display, at the display region, a first image indicating that the travel state is the first mode between the vehicle and the object.

According to the program of the ninth aspect, as described above, it is possible to improve visibility for an occupant when an object ahead of the vehicle is detected and the occupant, who has viewed the display region, is informed that travel of the vehicle is being controlled.

The present disclosure enables visibility to be improved for an occupant when an object ahead of the vehicle is detected and the occupant, who has viewed the display region, is informed that travel of the vehicle is being controlled.

BRIEF DESCRIPTION OF THE DRAWINGS

Exemplary embodiments of the present invention will be described in detail based on the following figures, wherein:

FIG. 2 is a block diagram illustrating a hardware configuration of a vehicle display control device according to the present exemplary embodiment;

DETAILED DESCRIPTION

In the following, a vehicle 12, to which a vehicle display control device 10 according to an exemplary embodiment has been applied, is explained with reference to the drawings. As an example, the vehicle 12 of the present exemplary embodiment is configured so as to be capable of being switched between autonomous driving and manual driving.

Autonomous driving is a travel mode of a vehicle in which some or all of the operation of the accelerator, the brakes, the direction indicators, steering, or the like, is performed automatically, and includes travel control of vehicles for the purpose of travel assistance, such as adaptive cruise control (ACC), radar cruise control, autonomous braking, and lane tracing assistance (LTA). Manual driving is a travel mode of a vehicle in which a driver performs all the driving operations (operation of the accelerator, the brakes, the direction indicators, steering, and the like).

Figure 1:
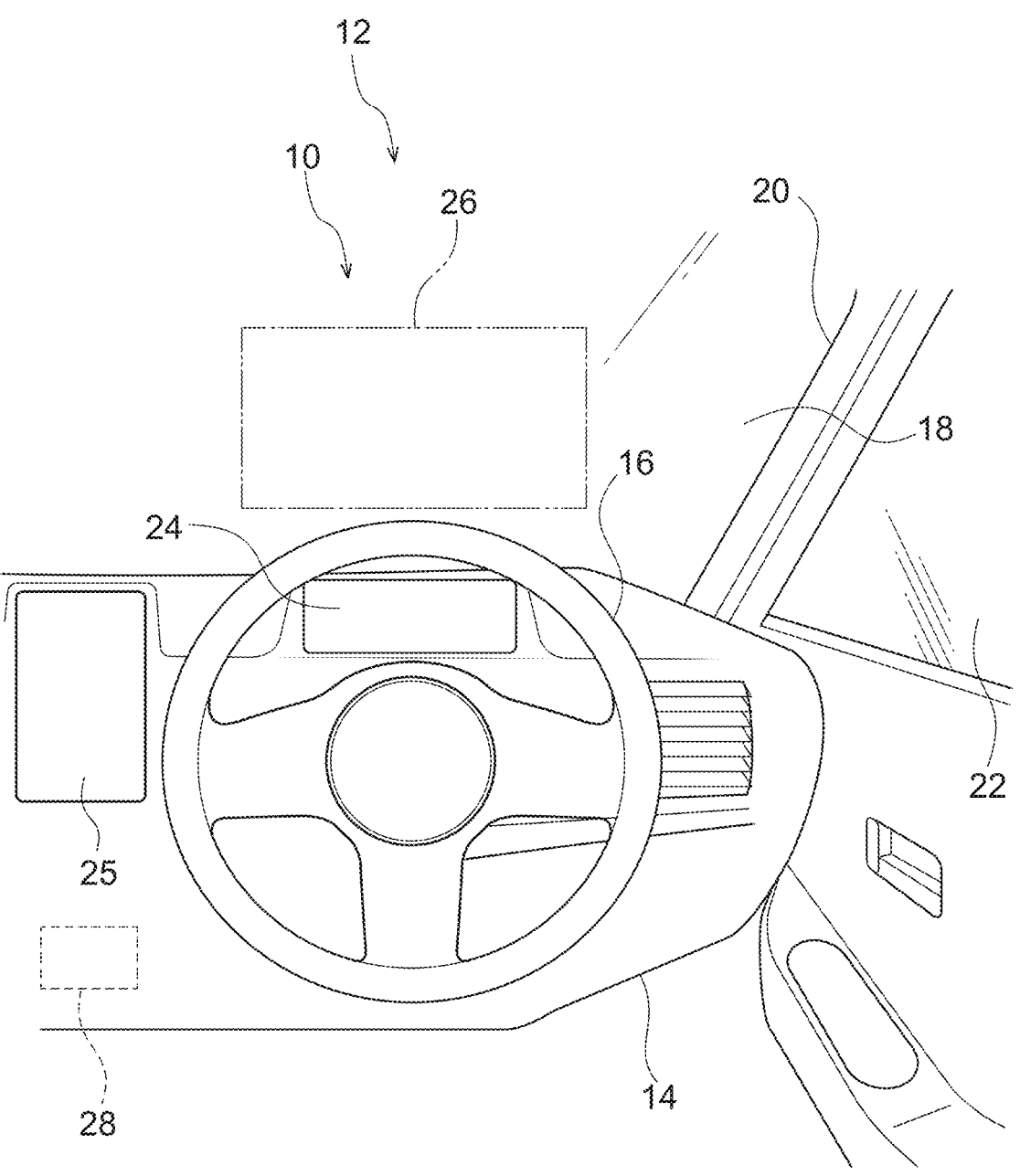
FIG. 1 is a schematic diagram illustrating a front part inside a vehicle cabin, viewed from a vehicle rearward side, in a vehicle to which a vehicle display control device according to the present exemplary embodiment is applied.

As illustrated in FIG. 1, an instrument panel 14 is provided at a front part of a vehicle 12 inside the vehicle cabin. The instrument panel 14 extends in the vehicle width direction, and a steering wheel 16 is provided at a vehicle right side of the instrument panel 14. Namely, in the present exemplary embodiment, as an example, a right hand drive vehicle is provided with the steering wheel 16 at the right side, and the driver's seat is provided at the right side of the vehicle.

A windshield glass 18 is provided at a front end portion of the instrument panel 14. The windshield glass 18 is disposed at a vehicle front side of the driving seat, and extends in a vehicle vertical direction and a vehicle width direction to partition an interior of the vehicle cabin from an exterior of the vehicle cabin.

The vehicle right side end part of the windshield glass 18 is fixed to a front pillar 20 at the right side of the vehicle. The front pillar 20 extends in the vehicle vertical direction, and the windshield glass 18 is fixed to an inner side end part, in the vehicle width direction, of the front pillar 20. A front end part of a front side glass 22 is fixed to an outer side end part, in the vehicle width direction, of the front pillar 20. The vehicle left side end part of the windshield glass 18 is fixed to a front pillar on the left side of the vehicle (not illustrated).

The instrument panel 14 is provided with a first display section 24 including a display region capable of displaying a predetermined image. The first display section 24 is configured by a meter display provided at a vehicle front side of the driving seat at a right side of the instrument panel 14 in the vehicle width direction. The meter display configures a part of a meter display device (not shown) connected to various meter devices installed in the vehicle 12. The first display section 24 is provided at a position that enters the driver's field of view in a state in which the driver's sightline is oriented toward the front of the vehicle.

The windshield glass 18 is provided with a second display section 25 including a display region capable of displaying a predetermined image. The second display section 25 is configured by a display provided at a center part of the instrument panel 14 in the vehicle width direction, at a vehicle front side of the driving seat.

The windshield glass 18 is provided with a third display section 26 including a display region capable of displaying a predetermined image. The third display section 26 is arranged at a vehicle upper side of the first display section

Figure 2:
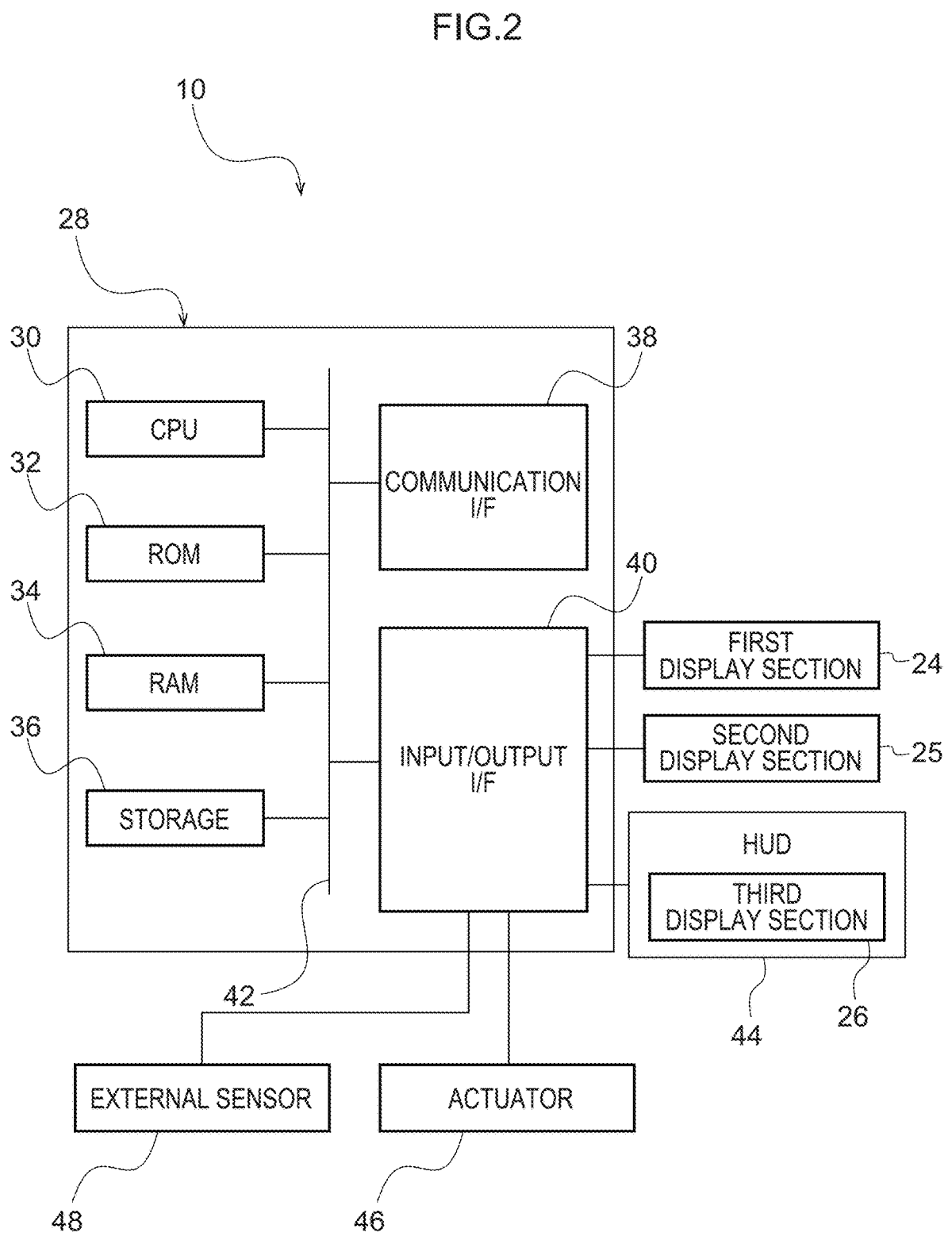

24, and is configured by a projection plane that is projected onto by a head-up display device 44 (see FIG. 2). More specifically, the head-up display device 44 is provided at a vehicle front side of the instrument panel 14, and the configuration is such that an image is projected from the head-up display device 44 onto the third display section 26 of the windshield glass 18. Namely, the third display section 26 is configured by the windshield glass 18 serving as a projection plane of the head-up display device 44.

Hardware Configuration of Vehicle Display Control Device 10

The vehicle 12 is provided with an electronic control unit (ECU) 28 serving as a control section. FIG. 2 is a block diagram illustrating a hardware configuration of the vehicle display control device 10. As illustrated in FIG. 2, the ECU 28 of the vehicle display control device 10 includes a central processing unit (CPU; processor) 30, a read-only memory (ROM) 32, a random access memory (RAM) 34, a storage 36, a communication interface 38, and an input/output interface 40. These configurations are connected via a bus 42 so as to be capable of communicating with each other. The CPU 30 is an example of a processor, and the RAM 34 is an example of a memory.

The CPU 30 is a central processing unit that executes various programs and controls various components. Namely, the CPU 30 reads a program from the ROM 32 or the storage 36, and executes the program using the RAM 34 as a workspace. The CPU 30 controls the respective configurations described above and performs various computation processing in accordance with a program stored in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and stores various programs including an operating system, as well as various data. In the present exemplary embodiment, a program for performing display processing, various data, and the like are stored in the ROM 32 or the storage 36.

The communication interface 38 is an interface used by the vehicle display control device 10 to communicate with non-illustrated servers and other devices, and for example, a protocol such as the Ethernet (registered trademark), LTE, FDDI, or Wi-Fi (registered trademark) is used.

The input/output interface 40 is connected to the head-up display device 44, an actuator 46, and an external sensor 48, which cause a predetermined image to be projected onto the first display section 24, the second display section 25, and the third display section 26. The actuator 46 includes a steering actuator, an accelerator actuator, and a brake actuator, and the steering actuator performs steering of the vehicle 12. The accelerator actuator performs acceleration of the vehicle 12. The brake actuator controls braking to thereby perform deceleration of the vehicle 12. In addition, a camera (not shown) that images inside the vehicle cabin of the vehicle 12, sensors for enabling autonomous driving of the vehicle 12, a global positioning system (GPS) device for acquiring position information of the vehicle 12, and the like, are connected to the input/output interface 40.

Functional Configuration of Vehicle Display Control Device 10

The vehicle display control device 10 implements various functions using the hardware resources described above. Explanation follows regarding the functional configuration implemented by the vehicle display control device 10, with reference to FIG. 3.

Figure 3:
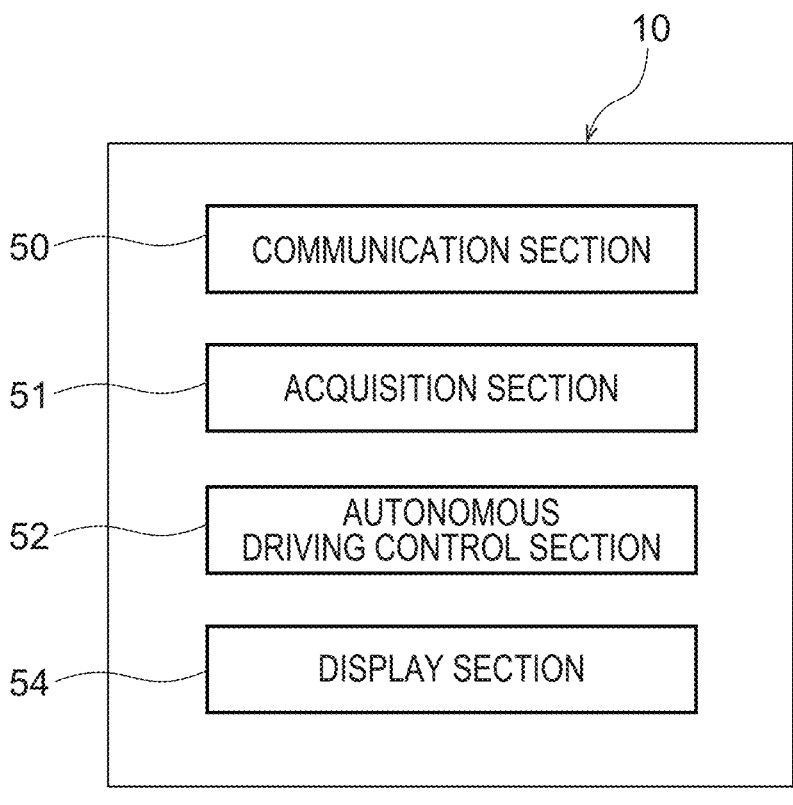
FIG. 3 is a block diagram illustrating a functional configuration of a vehicle display control device according to the present exemplary embodiment.

As illustrated in FIG. 3, the vehicle display control device 10 includes a communication section 50, an acquisition section 51, an autonomous driving control section 52, and a display section 54 as functional configurations. The respective functional configurations are implemented by the CPU 30 reading and executing a program stored in the ROM 32 or the storage 36.

The communication section 50 transmits and receives data to and from an external server and other equipment via the communication interface 38. For example, map data and traffic situation or other data stored in servers are exchanged. Moreover, the communication section 50 may be configured to perform inter-vehicle communication with a peripheral vehicle.

The acquisition section 51 acquires the travel environment of the vehicle 12 as peripheral information from the external sensor 48 via the input/output interface 40. The external sensor 48 includes at least one of a camera that images a predetermined range in the periphery of the vehicle 12, a millimeter-wave radar that transmits scanning waves over a predetermined range, or a LIDAR (Light Detection and Ranging/Laser Imaging Detection and Ranging) that scans a predetermined range. The "peripheral information" includes information relating to an object present within a predetermined range in the periphery of the vehicle 12 that is detected via the external sensor 48. Weather information and traffic information relating to the vehicle periphery received via the communication interface 38 are also included in the "peripheral information".

In the present exemplary embodiment, in particular, the acquisition section 51 acquires the travel state of the vehicle. The travel state of the vehicle includes a travel state in which an object ahead of the vehicle is detected and travel of the vehicle is controlled and, for example, includes a first mode and a second mode in which the ACC (Adaptive Cruise Control) function is switched on.

The adaptive cruise control (ACC) function is a function that detects a preceding vehicle ahead of the vehicle and travels so as to follow the preceding vehicle while maintaining a constant distance therefrom. The first mode of the ACC function is a travel state in which an object ahead of the vehicle is detected and travel of the vehicle is controlled, and more specifically, is a state in which a preceding vehicle is detected, and travel is implemented so as to follow the preceding vehicle while maintaining a constant distance therefrom. The second mode of the ACC function is a travel state that enables a switch to the first mode in a case in which an object has been detected ahead of the vehicle, and more specifically, is a state in which it is possible to switch to the first mode in a case in which a preceding vehicle has been detected by the external sensor 48. Moreover, in the second mode, the vehicle 12 is caused to travel at a predetermined travel velocity.

The autonomous driving control section 52 controls switching between manual driving and autonomous driving of the vehicle 12. For example, when the ACC function is switched on in the vehicle 12, the autonomous driving control section 52 switches to autonomous driving, and causes the vehicle 12 to be autonomously driven in the first mode or the second mode, while considering position information and peripheral information. More specifically, the actuator 46 is controlled so as to implement autonomous travel of the vehicle 12. The functionality of the autonomous driving control section 52 may control the actuator 46 based on a control command from an external device received via the communication interface 38, to thereby cause the vehicle 12 to travel autonomously.

The display section 54 generates an image for display at the third display section 26, which is the projection plane of the head-up display device 44, based on the travel state of the vehicle 12 acquired by the acquisition section 51, and causes the generated image to be displayed in the display region of the third display section 26. The generated images include, for example, various images for the purpose of assisting manual driving and autonomous driving, such as a speed meter for the vehicle 12.

In the present exemplary embodiment, in particular, in a case in which the travel state of the vehicle 12 is the first mode, the display section 54 generates and displays a first image 70 indicating that the travel state of the vehicle 12 is the first mode. Moreover, in a case in which the driving state of the vehicle 12 is the second mode, the display section 54 generates and displays a second image 80 indicating that the driving state of the vehicle 12 is the second mode.

The display control section 60 displays the first image 70 and the second image 80 at the third display section 26 so as to be integrated with the view ahead of the vehicle 12 as viewed through the third display section 26 (windshield glass 18). As an example, the display control section 60 refers to an image from a camera that images the view ahead of the vehicle 12 and to map data, and detects a preceding vehicle among the view ahead of the vehicle 12, and displays the first image 70 and the second image 80 in a space between the real image of the preceding vehicle and the host vehicle, as viewed through the third display section 26 by the driver in the driving seat. Specific aspects and display methods of the first image 70 and the second image 80 are described below.

Mechanism

Explanation follows regarding the mechanism of the present exemplary embodiment.

Display Processing

Figure 4:
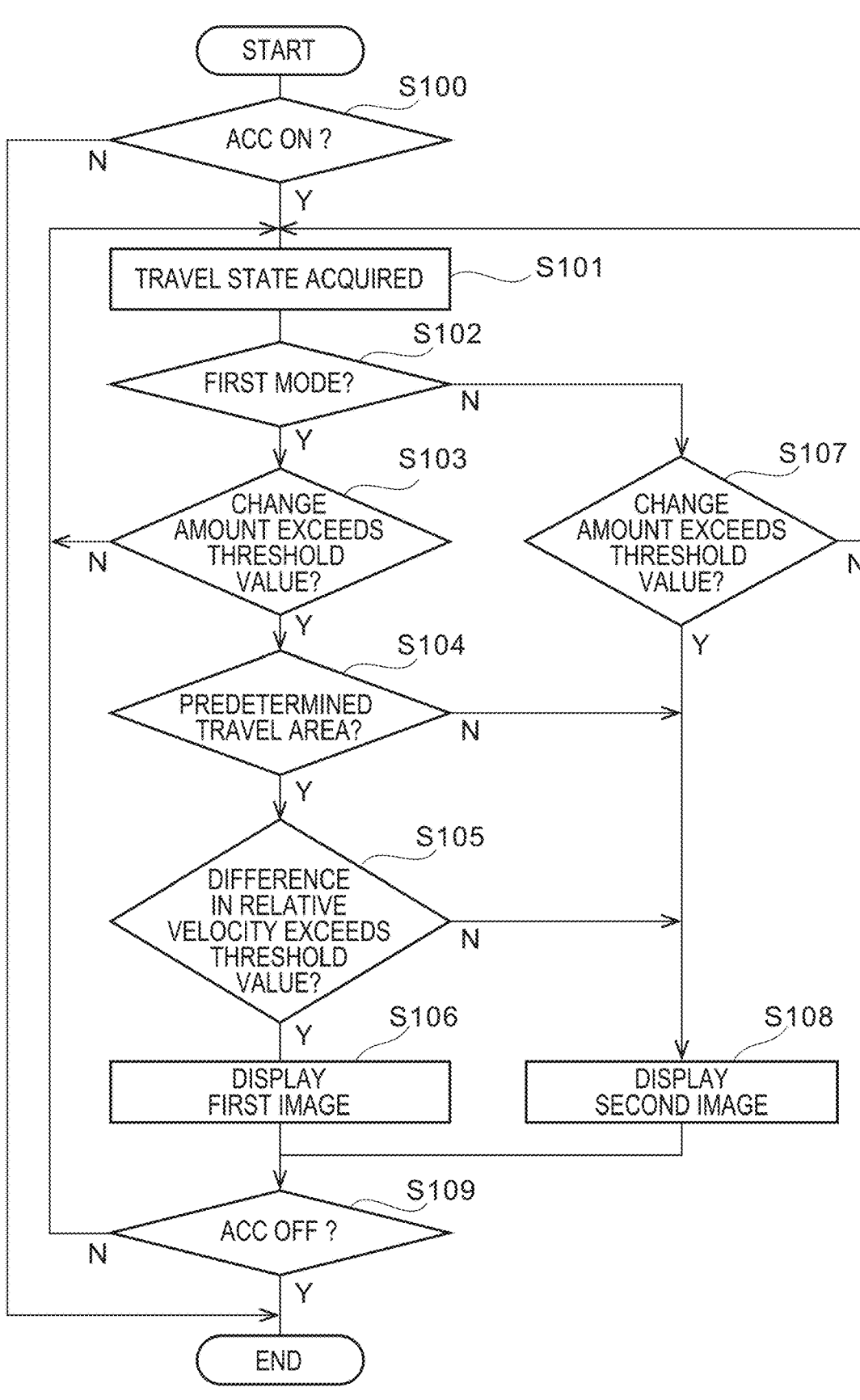
FIG. 4 is a flowchart illustrating an example of a flow of display processing in the present exemplary embodiment.

Explanation follows regarding an example of display processing in which the first image 70 and the second image 80 are displayed at a display region of the vehicle 12, with reference to FIG. 4. This display processing is executed by the CPU 30 reading a display program from the ROM 32 or the storage 36, and deploying the display program in the RAM 34.

As illustrated in FIG. 4, the CPU 30 determines whether or not the ACC function has been turned on at step S100.

In a case in which the CPU 30 determines at step S100 that the ACC function has been turned on, the processing transitions to step S101. In a case in which the CPU 30 determines at step S100 that the ACC function has been turned off, the display processing is ended.

At step S101, the CPU 30 acquires the travel state of the vehicle 12. More specifically, the CPU 30 acquires the travel state of the vehicle 12 using the functionality of the acquisition section 51.

At step S102, the CPU 30 determines whether or not the driving state of the vehicle 12 is the first mode. In a case in which the CPU 30 determines that the driving state of the vehicle is the first mode, the processing transitions to step S103. In a case in which the CPU 30 determines that the driving state of the vehicle is not the first mode (that is, is the second mode), the processing transitions to step S107.

At step S103, the CPU 30 determines whether or not an amount of change relating to the travel state of the vehicle 12 is equal to or greater than a predetermined threshold value. The amount of change relating to the travel state is, in this case, an amount of change relating to the first mode. The amount of change is an amount of change from which the degree of continuation of the travel state is understood.

In the present exemplary embodiment, for example, the amount of change is the time elapsed since the travel state of the vehicle 12 was switched to the first mode. The CPU 30 determines whether or not the time elapsed since the vehicle 12 was switched to the first mode is equal to or greater than a predetermined threshold value. In a case in which the CPU 30 determines that the elapsed time is equal to or longer than the predetermined threshold value, the processing transitions to step S104. In a case in which the elapsed time is determined to be less than the predetermined threshold value, the processing returns to step S101 and is repeated.

The amount of change relating to the travel state is not limited to the elapsed time described above, and the threshold value may be set using a time or distance during which the vehicle 12 has traveled at a constant speed as the amount of change. Alternatively, the threshold value may be set using the distance between the vehicle 12 and the preceding vehicle as the amount of change.

At step S104, the CPU 30 determines whether or not the current position of the vehicle 12 is within a predetermined travel area. The predetermined travel area may be defined by at least one of an area that permits, restricts, or specifies a specific travel method in relation to travel of the vehicle 12 pursuant to road traffic regulations, or an area other than these areas. The predetermined travel area may also be defined, for example, by traffic conditions on a road on which the vehicle 12 is to travel. In the present exemplary embodiment, as an example, an expressway is defined as a predetermined travel area. It is assumed that in a case in which the travel area of the vehicle 12 is an expressway, travel in a constant travel state can continue for a long time. Moreover, it is assumed that the vehicle-to-vehicle distance relative to a preceding vehicle V can be adequately secured on an expressway.

Further, in a case in which the CPU 30 determines at step S104 that the travel area is an expressway, the processing transitions to step S105, and in a case in which it is determined that the travel area is not an expressway, the processing transitions to step S108.

At step S105, the CPU 30 determines whether or not a difference in relative velocity between the vehicle 12 and the preceding vehicle is equal to or greater than a predetermined threshold value. For example, the CPU 30 calculates a difference in relative velocity between the vehicle 12 and a preceding vehicle based on information detected by the external sensor 48. In a case in which it is determined that the difference in relative velocity between the vehicle 12 and the preceding vehicle is equal to or greater than a predetermined threshold value, it is presumed that the preceding vehicle will move away from the vehicle within a short period of time and will no longer be a detection target, or that the preceding vehicle will rapidly approach the vehicle within a short period of time, thereby narrowing the space between the object and the vehicle.

Further, in a case in which the CPU 30 determines that the difference in relative velocity is equal to or greater than a predetermined threshold value, the processing transitions to step S106, and the first image 70 is displayed (switched to) at the third display section 26. However, in a case in which it is determined that the relative speed difference is less than a predetermined threshold value, the processing transitions to step S108, and the second image 80 is displayed (switched to) at the third display section 26.

Figure 5:
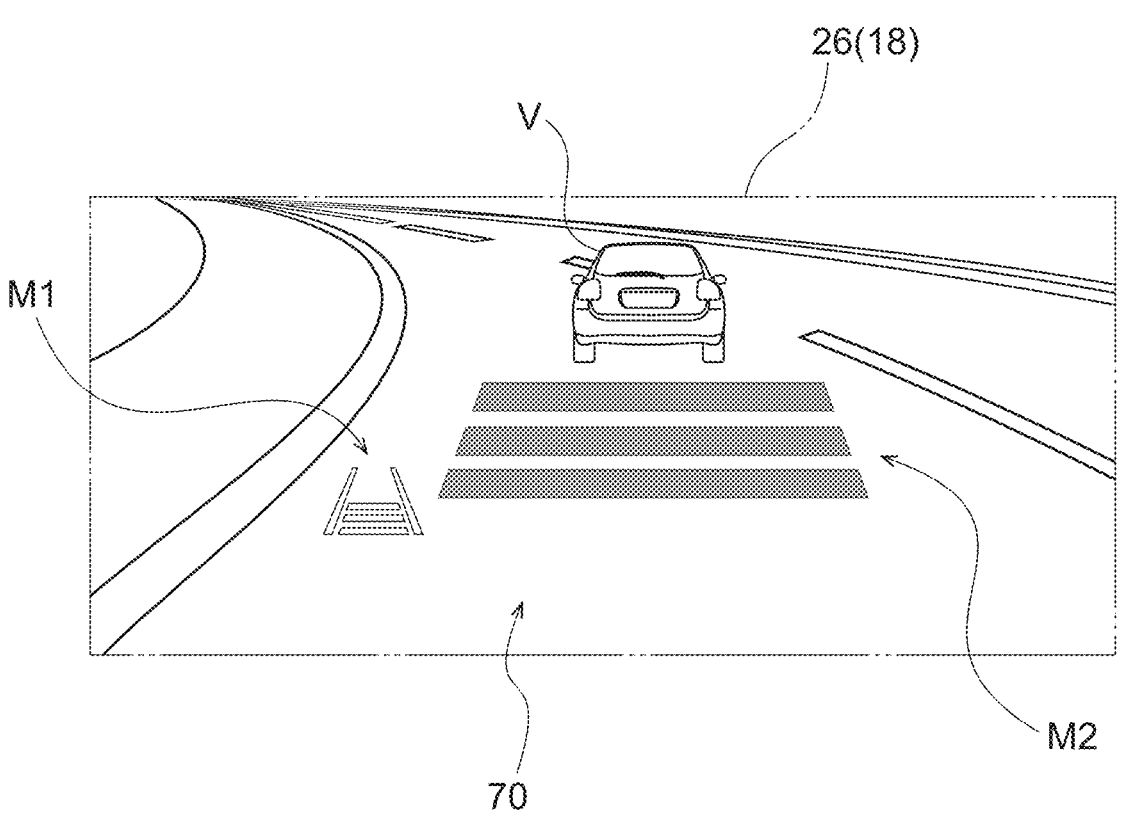
FIG. 5 is a diagram illustrating an example of display of a first image in the present exemplary embodiment.

Explanation follows regarding an example of the first image 70 displayed at the third display section 26, with reference to FIG. 5. As illustrated in this drawing, the first image 70 includes a first object M1 displayed with a small size at a lower part of the display region and a second object M2 displayed in a large and emphasized manner at the center of the display region. As an example, the first object M1 is an image simulating a travel lane, indicating that the ACC functionality of the vehicle 12 is turned on. As an example, the second object M2 is an image in which three markers extending in the road width direction (vehicle width direction) are arranged side by side in the travel direction of the vehicle 12, indicating that the vehicle 12 is detecting the preceding vehicle V and traveling in a manner following the preceding vehicle V.

The first image 70 including the first and second objects M1, M2 is displayed at a position that does not overlap with the preceding vehicle V (in the present exemplary embodiment, a real image thereof) displayed at the display region at a front side of the vehicle 12. Therefore, an occupant who has viewed the third display section 26 can clearly distinguish between the preceding vehicle V and the first image 70 and recognize them both. Moreover, by viewing the first image 70, the occupant will learn from the ACC function of the vehicle 12 that the vehicle 12 is following the preceding vehicle V.

Figure 6:
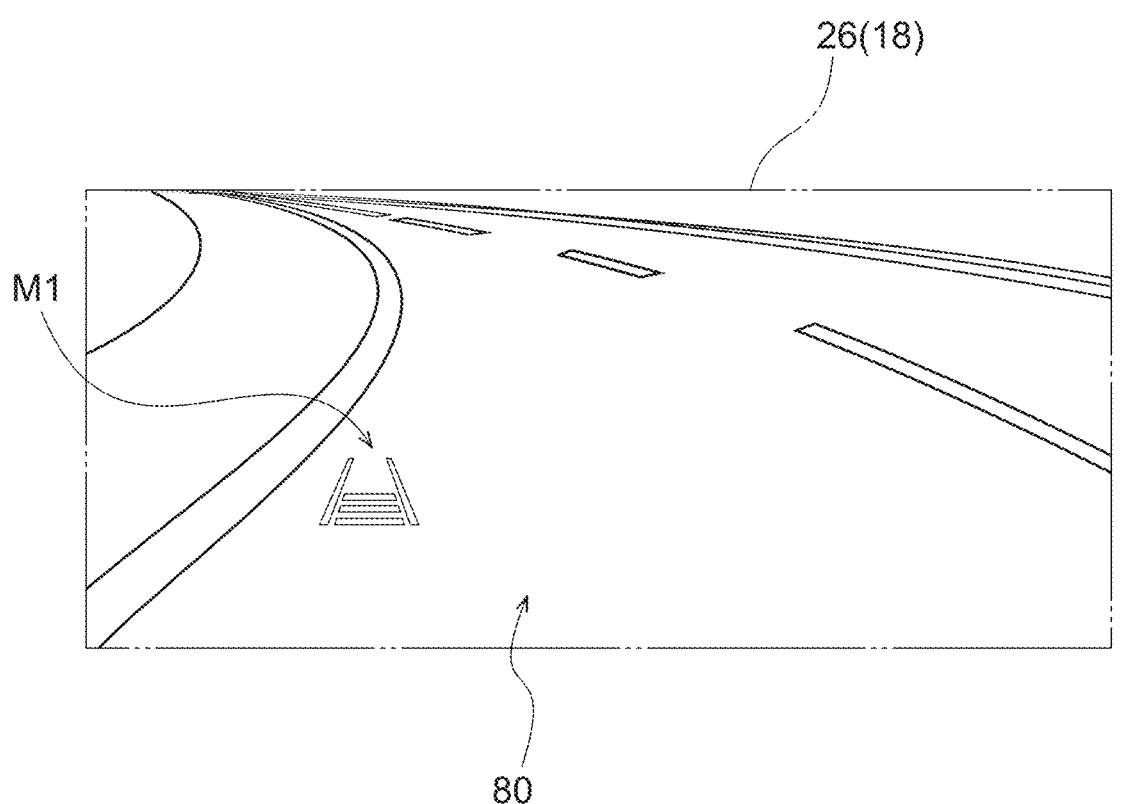
FIG. 6 is a diagram illustrating an example of display of a second image in the present exemplary embodiment.

Explanation follows regarding an example of the second image 80 displayed at the third display section 26, with reference to FIG. 6. As illustrated in this drawing, the second image 80 includes only the first object M1 that is displayed with a small size at a lower part of the display region. Upon seeing the second image 80, the occupant will understand that the ACC function is turned on. Moreover, in a case in which no preceding vehicle is present, it is possible to recognize that the travel state of the vehicle 12 is a state that enables a switch to the first mode in a case in which a preceding vehicle that should be followed is detected.

In this way, through steps S103 to S105, the CPU 30 determines the likelihood that the driving state of the vehicle 12 will switch frequently and the likelihood that the inter-vehicle distance relative to the preceding vehicle cannot be stably secured, even in cases in which the driving state of the vehicle 12 is the first mode. Moreover, in cases in which such a likelihood is high, the CPU 30 does not switch to the first image, thereby not displaying the second object M2 that emphasizes travel following a preceding vehicle. This enables blinking of the third display section 26 caused by frequent switching between the first image and the second image, and display of an image (object) at a position overlapping with the preceding vehicle, to be suppressed.

However, in a case in which the CPU 30 determines at step S102 that the driving state of the vehicle 12 is the second mode, the processing transitions to step S107, and a determination is made as to whether or not the amount of change relating to the second mode is equal to or greater than a predetermined threshold value. Since the amount of change relating to the second mode is similar to the determination of the threshold value of the amount of change relating to the first mode at step S103 described above, detailed explanation thereof is omitted.

Further, in a case in which the CPU 30 determines at step S107 that the amount of change is equal to or greater than a predetermined threshold value—namely, that the time elapsed since the switch to the second mode has exceeded the predetermined threshold value—the processing transitions to step S108. However, in a case in which it is determined in step S107 that the amount of change is less than the predetermined threshold value, the processing returns to step S101 and is repeated.

At step S108, the CPU 30 displays (switches to) the second image 80 at the third display section 26. Upon seeing the second image 80, the occupant confirms that the ACC function of the vehicle 12 is turned on, and understands that in a case in which a preceding vehicle that should be followed has been detected, the driving state of the vehicle 12 will be switched to the first mode.

At step S109, the CPU 30 determines whether or not the ACC function has been turned off. In a case in which the CPU 30 determines that the ACC function has been turned off, the display processing is ended. Further, in a case in which it is determined that the ACC function has not been turned off, the processing returns to step S101 and is repeated.

As described above, the vehicle display control device 10 of the present exemplary embodiment displays a predetermined image at the display region of the third display section 26, which shows the view ahead of the vehicle 12. Moreover, according to the display processing illustrated in FIG. 4, the driving state of the vehicle 12 is acquired, and in a case in which the acquired driving state is the first mode, the first image 70 is displayed at the display region of the third display section 26. This enables the vehicle 12 to detect a preceding vehicle and to inform an occupant who has viewed the third display section 26 that travel of the vehicle 12 is being controlled.

As illustrated in FIG. 5, the first image 70 is displayed between the vehicle 12 and the preceding vehicle V in the display region of the third display section 26. Accordingly, since an occupant who has viewed the third display section 26 can clearly distinguish between the preceding vehicle V and the first image 70, visibility for the occupant is improved.

Moreover, according to the display processing, in a case in which the acquired travel state is the second mode, the image displayed at the third display section 26 is switched to the second image 80. As a result, the ACC function is turned on even in a state in which the preceding vehicle V is not present, and it is possible to provide the occupant with a sense of security by informing the occupant that a switch to the first mode is possible in a case in which a preceding vehicle V has been detected.

Moreover, according to the display processing, the image displayed at the third display section 26 is switched in a case in which the amount of change relating to the driving state of the vehicle 12 is equal to or greater than a predetermined threshold value. Namely, image switching is not performed until the amount of change relating to the travel state exceeds a predetermined threshold value, and image switching is performed after a predetermined travel state has been maintained for a given period. More specifically, in the present exemplary embodiment, image switching is performed in a case in which the time elapsed since the driving state of the vehicle 12 was switched to the first mode or the second mode is equal to or longer than a predetermined threshold value. As a result, when the driving state of the vehicle is frequently switched owing to road congestion, for example, since "hunting", in which the display image of the third display section 26 is frequently switched in conjunction therewith, can be prevented, visibility for the occupant is improved.

Moreover, according to the display processing, in a case in which the vehicle 12 is traveling through a predetermined travel area, the image displayed at the third display section 26 can be switched to the first image 70. More specifically, in the present exemplary embodiment, switching to the first image is possible in a case in which the vehicle 12 is traveling on an expressway. Namely, by enabling switching to the first image 70 only in cases in which the vehicle 12 is traveling in a travel area, such as on an expressway, in which travel in the first mode can be continued for a long time, in an area in which the driving state of the vehicle 12 is frequently switched, the visibility of an occupant can be improved by intentionally not switching to the first image even in a state in which the vehicle 12 is driving in the first mode.

Moreover, according to the display processing, in a case in which, when the vehicle 12 is traveling in the first mode, the relative speed difference between the vehicle 12 and the preceding vehicle is equal to or greater than a predetermined threshold value, the first image 70 is not displayed at the third display section 26. Accordingly, the first image 70 is not displayed in cases in which it is assumed that the preceding vehicle will move away from the vehicle 12 within a short period of time and no longer qualify as a detection target, or in cases in which it is assumed that the preceding vehicle is approaching the vehicle 12 quickly and it will be difficult to display an image between the preceding vehicle and the vehicle 12. This enables the first image 70 to be displayed only in a case in which the first image 70 can be stably displayed for a relatively long period of time, thereby reducing complications caused by frequent image switching, and improving the visibility of the occupant.

Moreover, in the vehicle display control device 10 according to the present exemplary embodiment, a display region indicating the view ahead of the vehicle 12 is configured by a projection plane that is projected onto by the head-up display device 44 at a front side of the vehicle relative to the driver's seat. The first image 70 is displayed between the vehicle 12 and a real image preceding vehicle in the view ahead of the vehicle 12 that is viewed through the display region. Accordingly, since the view ahead that is visible from the driver's seat through the windshield glass 18 and the first image 70 are displayed in a coordinated manner, an occupant of the driver's seat is able to see the first image 70 without significantly moving his or her line of sight.

Supplementary Explanation

In the exemplary embodiment described above, in a case in which the first image is displayed at the third display section 26, as with a first image 90 according to the modified example illustrated in FIG. 7, the display mode of the first image 90 may be changed in accordance with the distance between the vehicle 12 and the preceding vehicle V.

Figure 7A:
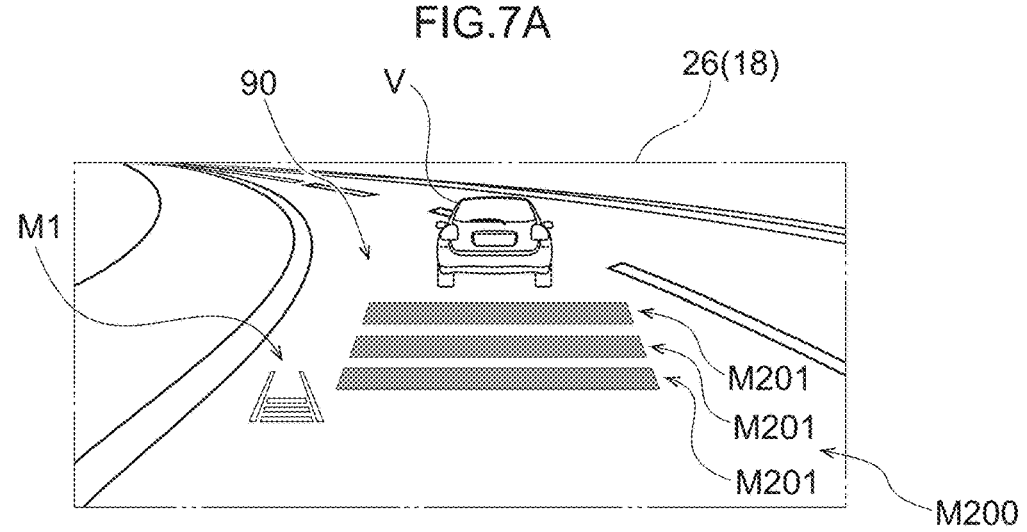
FIG. 7A is a diagram illustrating an example of display of a first image according to a modified example of the present exemplary embodiment, and is an example of display at a time at which a vehicle has detected a preceding vehicle at a point at which a distance L between the preceding vehicle and the vehicle is greater than or equal to a first distance L1.
Figure 7B:
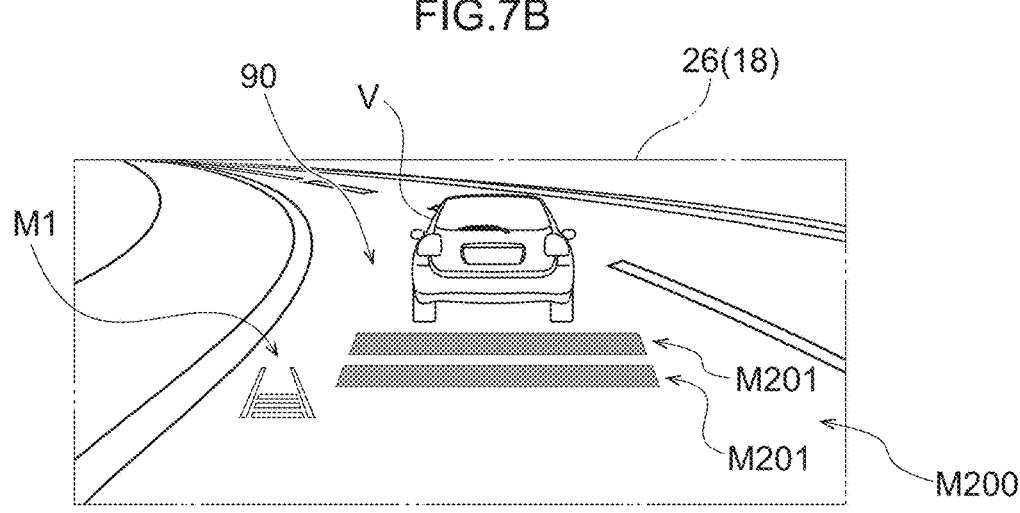
FIG. 7B is a diagram illustrating an example of display of a first image according to a modified example of the present exemplary embodiment, and is an example of display at a time at which a vehicle has approached a preceding vehicle at a point at which the distance L between the preceding vehicle and the vehicle is greater than or equal to the first distance L1.
Figure 7C:
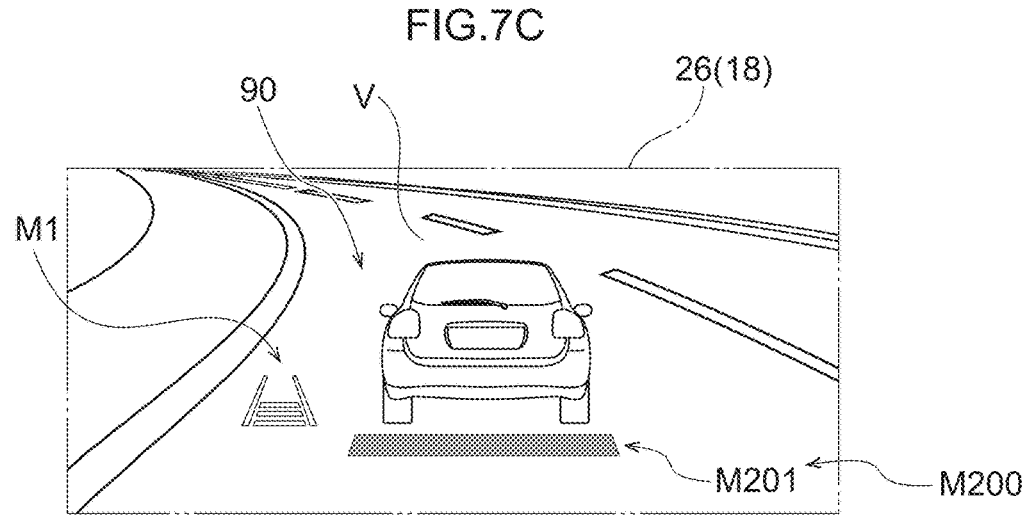
FIG. 7C is a diagram illustrating an example of display of a first image according to a modified example of the present exemplary embodiment, and is an example of display at a time at which a point has been reached at which the distance L between the preceding vehicle and the vehicle is the first distance L1.

FIG. 7A illustrates an example of display at a point in time at which the vehicle 12 detects a preceding vehicle at a point at which the distance between the preceding vehicle V and the vehicle 12 is equal to or greater than a predetermined first distance. FIG. 7B is a display example at a point at which the distance between the preceding vehicle V and the vehicle 12 is greater than or equal to the predetermined first distance, at a point in time at which the vehicle 12 has moved closer to the preceding vehicle than the point illustrated in FIG. 7A. FIG. 7C is a display example at a point in time at which the distance between the preceding vehicle V and the vehicle 12 has reached a point that is the predetermined first distance. Here, the predetermined first distance is an inter-vehicle distance that is maintained when the vehicle 12 travels so as to follow the preceding vehicle V.

As illustrated in FIG. 7A to FIG. 7C, the first image 90 includes a first object M1 and a second object M200. The second object M200 is configured by markers M201 that extend in the road width direction (vehicle width direction). The number of markers M201 is changed as the distance between the vehicle 12 and the preceding vehicle V decreases. In the present exemplary embodiment, at a point of maximum distance between the vehicle 12 and the preceding vehicle V, three markers M201 are arranged in a row along the travel direction of the vehicle 12. The number of markers M201 decreases as the distance from the vehicle 12 to the preceding vehicle V shortens, and the number of markers M201 becomes one at a point at which the distance from the vehicle 12 to the preceding vehicle V becomes the first distance. This enables an occupant who has viewed the first image 70 to recognize, in advance, the preceding vehicle to be followed prior to initiation of following-travel using the ACC function, enabling the occupant to be imparted with a sense of security.

Figure 8:
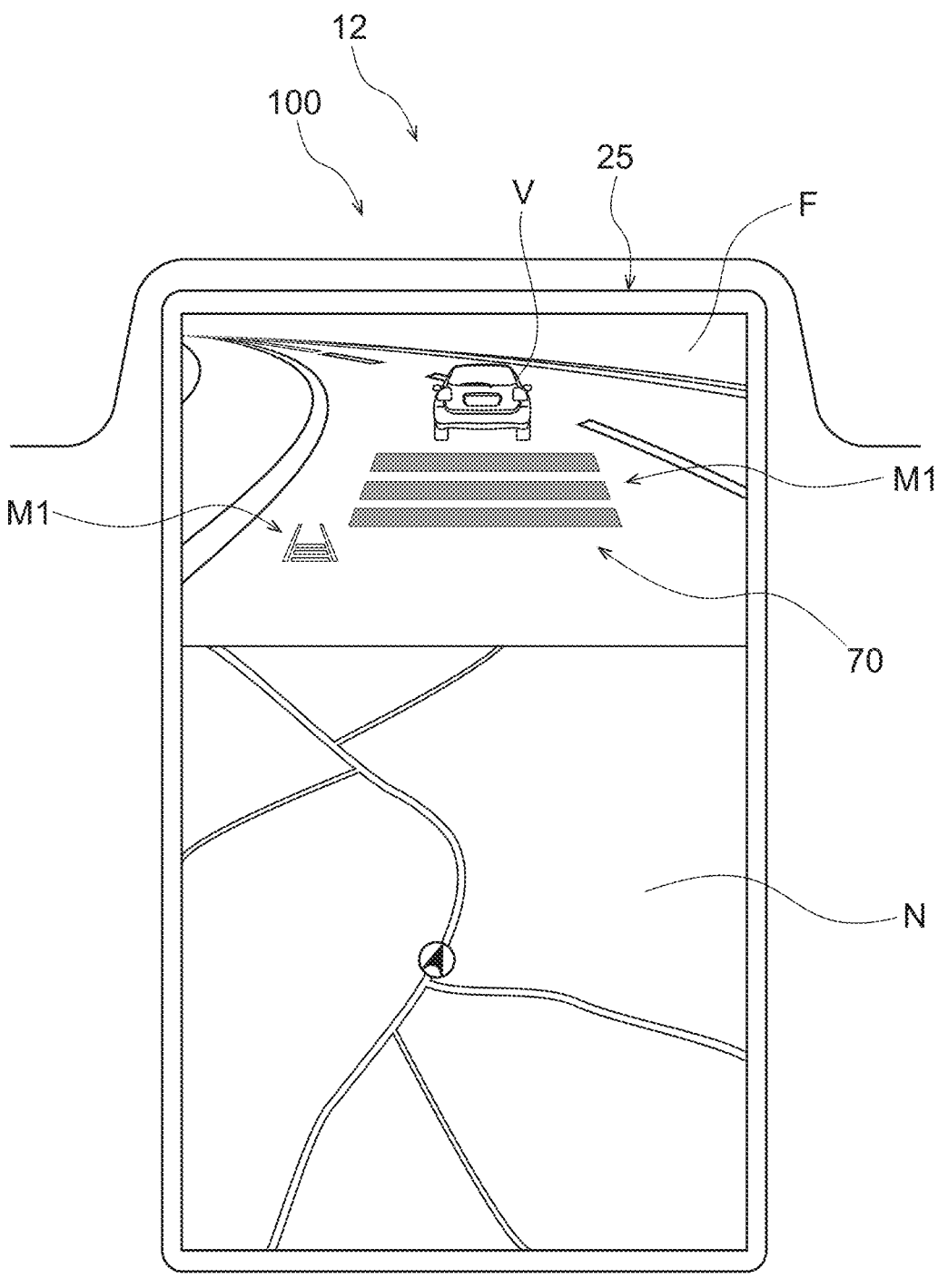
FIG. 8 is a schematic diagram illustrating a vehicle display device according to a modified example of the present exemplary embodiment.

Although explanation has been given regarding a case in which the display region indicating the view ahead of the vehicle is configured by the projection plane of the head-up display device 44 in the exemplary embodiment described above, the present disclosure is not limited thereto. As in the vehicle display control device 100 according to the modified example illustrated in FIG. 8, the first image 70 or the second image 80 may be displayed at a display region of the second display section 25, which is configured by a display provided on the instrument panel 14. The second display section 25 illustrated in FIG. 8 displays a map image N indicating the current position of the vehicle 12 at a lower portion of the display region, and a foreground image F indicating the view ahead of the vehicle at an upper portion of the display region. The foreground image F is configured, for example, by an image acquired from a camera that images a front view from the vehicle 12, or a foreground image generated by animation.

Similarly, in the instrument panel 14, the first image 70 or the second image 80 may be displayed at a display region of the first display section 24, which is a meter display provided at a vehicle front side relative to the driving seat.

The display modes of the first image and the second image described in the foregoing exemplary embodiment and modified examples are simply examples, and may be modified as appropriate within a range that does not depart from the gist of the present disclosure.

Although following-travel using the ACC function has been described as a first mode in which an object ahead of the vehicle is detected and travel of the vehicle is controlled in the foregoing exemplary embodiment and modified examples, there is no limitation thereto. For example, the configuration of the present disclosure can be applied to cases in which travel of the vehicle 12 is controlled by a radar cruise control function, an autonomous brake function, or the like. In this case, although the "preceding vehicle" serving as a moving object has been described as an object ahead of the vehicle in the foregoing exemplary embodiment, there is no limitation thereto, and a stationary object, or a flying object such as a drone, may be detected as the object.

Although an expressway was selected as the "predetermined travel area" relating to step S104 in the display processing of the exemplary embodiment described above, there is no limitation thereto. For example, an area other than an area that restricts or designates a specific travel method according to road traffic regulations may be defined as a predetermined travel area. Namely, areas in which specific travel methods are restricted or designated in accordance with road traffic regulations are usually provided with road markings aimed at drivers of vehicles. Accordingly, in such areas, by not displaying the first image 70, it is possible to prevent the visibility of the road markings from being reduced, enabling visibility for the occupant to be improved.

Although the exemplary embodiment described above is configured to display an image at a display region provided inside the vehicle cabin, the present disclosure is not limited thereto. For example, in a case in which an operation signal is received from a remote device provided outside the vehicle 12 and the vehicle 12 is remotely controlled, if the operator of the remote control device is treated as an occupant of the vehicle 12, the display region is not limited to a case in which the display region is provided inside the vehicle cabin, and may be provided outside the vehicle 12. Further, a configuration may be adopted in which the first image 70 and the second image 80 may be displayed at a display region provided outside the vehicle 12.

The display processing executed by the CPU reading and executing software (a program) in the exemplary embodiment described above may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The display processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although explanation has been given regarding an aspect in which the programs for display processing and lane change display processing are stored (installed) in advance in a ROM or storage in the exemplary embodiment described above, there is no limitation thereto. The programs may be provided in a format recorded on a recording medium such as compact disc read only memory (CD-ROM), digital versatile disc read only memory (DVD-ROM), or universal serial bus (USB) memory. Alternatively, the programs may be provided in a format that is downloadable from an external device via a network.

What is claimed is:

1. A vehicle display control device configured to display a predetermined image at a display region showing a view ahead of a vehicle and provided at a windshield glass of the vehicle, the device comprising:

a memory; and a processor coupled to the memory, the processor being configured to:

acquire a travel state of the vehicle after a cruise control function is activated, in a case in which the acquired travel state is a first mode in which a moving object ahead of the vehicle is detected and travel of the vehicle is controlled so as to follow the moving object, display, at the display region, a first image indicating that the travel state is the first mode in a space between an actual image of the moving object viewed through the windshield glass and the vehicle, in a case in which the acquired travel state is a second mode enabling a switch to the first mode in the case in which the moving object ahead of the vehicle is detected, the second mode being a mode in which the moving object ahead of the vehicle is not currently detected, display, at the display region, a second image indicating that the travel state is the second mode in the space, wherein the first image is configured to comprise a first object being an image simulating a travel lane, and indicating that an executed functionality in the first mode is turned on and displayed at a lower and side portion of the display region, and a second object being displayed in larger size than the first object and being an image in which a plurality of markers extending in a road width direction are arranged side by side in a travel direction of the vehicle in a center portion of the display region, and wherein the second image consists of the first object.

2. The vehicle display control device recited in claim 1, wherein, after the travel state of the vehicle has been acquired, the processor is further configured to cause the image displayed at the display region to change to the first image or the second image, in a case in which an amount of change related to the acquired travel state of the vehicle is equal to or greater than a predetermined threshold value.

3. The vehicle display control device recited in claim 1, wherein the processor is further configured to enable switching of the image displayed at the display region to the first image in a case in which the vehicle is traveling in a predetermined travel area.

4. The vehicle display control device recited in claim 1, wherein the processor is further configured to not display the first image at the display region in a case in which a difference in relative velocity between the vehicle and the object is equal to or greater than a predetermined threshold value at a time at which the vehicle is traveling in the first mode.

5. The vehicle display control device recited in claim 1, wherein:

the display region comprises a projection plane that is projected onto by a head-up display at a vehicle front side relative to a driver's seat, and the processor is further configured to display the first image between the vehicle and the object in a view ahead of the vehicle that is viewed through the display region.

6. The vehicle display control device of claim 1, wherein a number of markers extending in the road width direction corresponds to a distance to the moving object ahead of the vehicle.

7. A method of displaying a predetermined image at a display region showing a view ahead of a vehicle and provided at a windshield glass of the vehicle, the method comprising:

acquiring a travel state of the vehicle after a cruise control function is activated;

in a case in which the acquired travel state is a first mode in which a moving object ahead of the vehicle is detected and travel of the vehicle is controlled so as to follow the moving object, displaying, at the display region, a first image indicating that the travel state is the first mode in a space between an actual image of the moving object viewed through the windshield glass and the vehicle, in a case in which the acquired travel state is a second mode enabling a switch to the first mode in the case in which the moving object ahead of the vehicle is detected, the second mode being a mode in which the moving object ahead of the vehicle is not currently detected, displaying, at the display region, a second image indicating that the travel state is the second mode in the space, wherein the first image is configured to comprise a first object being an image simulating a travel lane, and indicating that an executed functionality in the first mode is turned on and displayed at a lower and side portion of the display region, and a second object being displayed in larger size than the first object and being an image in which a plurality of markers extending in a road width direction are arranged side by side in a travel direction of the vehicle in a center portion of the display region, and wherein the second image consists of the first object.

8. A non-transitory computer-readable storage medium storing a program executable by a processor to perform processing for displaying a predetermined image at a display region showing a view ahead of a vehicle and provided at a windshield glass of the vehicle, the processing comprising:

acquiring a travel state of the vehicle after a cruise control function is activated;

in a case in which the acquired travel state is a first mode in which a moving object ahead of the vehicle is detected and travel of the vehicle is controlled so as to follow the moving object, displaying, at the display region, a first image indicating that the travel state is the first mode in a space between an actual image of the moving object viewed through the windshield glass and the vehicle, in a case in which the acquired travel state is a second mode enabling a switch to the first mode in the case in which the moving object ahead of the vehicle is detected, the second mode being a mode in which the moving object ahead of the vehicle is not currently detected, displaying, at the display region, a second image indicating that the travel state is the second mode in the space, wherein the first image is configured to comprise a first object being an image simulating a travel lane, and indicating that an executed functionality in the first mode is turned on and displayed at a lower and side portion of the display region, and a second object being displayed in larger size than the first object and being an image in which a plurality of markers extending in a road width direction are arranged side by side in a travel direction of the vehicle in a center portion of the display region, and wherein the second image consists of the first object.

\*  \*  \*  \*  \*